(12) United States Patent
Miyamoto et al.

(10) Patent No.: US 6,313,259 B1
(45) Date of Patent: Nov. 6, 2001

(54) PROCESS FOR PRODUCING AROMATIC POLYCARBONATE AND AROMATIC POLYCARBONATE COMPOSITION

(75) Inventors: Masaaki Miyamoto; Masanori Yamamoto; Yuuichi Nishida, all of Kitakyushu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/654,175

(22) Filed: Sep. 1, 2000

(30) Foreign Application Priority Data

Sep. 2, 1999 (JP) .................................................. 11-248739
Sep. 3, 1999 (JP) .................................................. 11-250287

(51) Int. Cl.[7] .................................................. C08G 64/00
(52) U.S. Cl. .................................................. 528/196
(58) Field of Search .............................................. 528/196

(56) References Cited

FOREIGN PATENT DOCUMENTS 3-23571    3/1991  (JP) .
9-286850   11/1997  (JP) .
10-279678  10/1998  (JP) .

*Primary Examiner*—Terressa M. Boykin
(74) *Attorney, Agent, or Firm*—David G. Conlin; Peter F. Corless; Dike, Bronstein, Roberts & Cushman

(57) ABSTRACT

The process for producing an aromatic polycarbonate of the present invention comprises subjecting an aromatic diol compound and a carbonic acid diester to transesterification reaction in the presence of a defoaming agent. In the process of the present invention, it is possible to produce a transparent and colorless aromatic polycarbonate having a high quality, at a high polymerization velocity without occurrence of significant foaming phenomenon.

14 Claims, 6 Drawing Sheets

PROCESS FOR PRODUCING AROMATIC POLYCARBONATE AND AROMATIC POLYCARBONATE COMPOSITION

BACKGROUND OF THE INVENTION

The present invention relates to a process for producing an aromatic polycarbonate and an aromatic polycarbonate composition, and more particularly, to a process for producing a transparent and colorless aromatic polycarbonate having a high quality, at a high polymerization velocity without occurrence of significant foaming phenomenon, by the transesterification reaction of an aromatic diol compound and a carbonic acid diester, especially such a polycarbonate for optical applications, and a transparent and colorless aromatic polycarbonate composition having a high quality.

Recently, aromatic polycarbonates have been extensively used as engineering plastics in various applications such as office automation (OA) parts, automobile parts, building materials and the like, because these polycarbonates are excellent in not only mechanical properties such as impact resistance but also heat resistance, transparency and the like. Especially, these aromatic polycarbonates have been widely applied to optical materials such as lens, discs or sheets, due to excellent impact resistance and transparency thereof.

The aromatic polycarbonates have been industrially produced by a socalled phosgene method of reacting an aromatic diol with phosgene by interfacial polycondensation method. However, in the phosgene method, it is inevitably required to use phosgene which is quite harmful to human bodies, as well as a solvent such as dichloromethane adversely affecting environmental conditions. In addition, in the phosgene method, a large amount of sodium chloride as by-product is mixed in the aimed polymer, thereby causing problems such as corrosion when the polymer is applied to electronic parts.

Also, there is hitherto known a so-called melting method or non-phosgene method in which the aromatic polycarbonate is produced by subjecting an aromatic diol compound and a carbonic acid diester both kept in a molten state to transesterification while discharging low-molecular weight compounds produced as by-products such as phenol out of the reaction system. The non-phosgene method has such an advantage that the aromatic polycarbonate can be produced without suffering from such problems as observed in the above interfacial polycondensation method. However, the non-phosgene method should be conducted at a higher polymerization temperature as compared to that of the phosgene method, so that the obtained polycarbonate product tends to undergo undesired discoloration. Further, in the non-phosgene method, it is required to continuously increase a molecular weight of the polycarbonate while discharging the by-produced low-molecular weight compounds such as phenol from the reaction system, thereby causing the increase in viscosity of the reaction system with the passage of time. This leads to occurrence of severe foaming phenomenon due to evaporation of the low-molecular weight compounds, thereby inducing entrainment of splashes or rapid rise of the liquid level which in turn cause not only clogging of exhaust systems but also such a problem that degraded materials attached to an upper portion of the polymerization reactor are mixed in the aimed product, resulting in discoloration and poor quality of the product. When the exhaust velocity is lowered in order to inhibit the foaming phenomenon, the polymerization velocity becomes insufficient, so that the obtained polymer is exposed to an elevated temperature for a longer period of time, resulting in deteriorated color tone of the polycarbonate produced. Besides, in order to increase the exhaust velocity to such an extent sufficient to reduce a residence time in a heated state of the polycarbonate, it is necessary to use a polymerization reactor having a far larger capacity than the volume of liquid to be treated, resulting in inefficient process from the standpoints of heat efficiency and productivity.

As the method of inhibiting the above foaming phenomenon, for example, in Japanese Patent Application Laid-Open (KOKAI) No. 9-286850(1997), there is described a method using so-called defoaming blades for directly agitating the liquid level and mechanically breaking foams produced. However, the above conventional method has problems such as limited effect due to the mechanical defoaming operation, and use of excessively large-scale facilities.

As a result of the present inventors, earnest studies for solving the above problems, it has been found that by using specific compounds as a deforming agent, it is possible to produce a transparent and colorless aromatic polycarbonate having a high quality, at a high polymerization velocity without occurrence of severe foaming phenomenon. The present invention has been attained on the basis of the finding.

SUMMARY OF THE INVENTION

It is an object of the present invention to provide a process for producing a transparent and colorless aromatic polycarbonate having a high quality, at a high polymerization velocity without occurrence of severe foaming phenomenon, by subjecting an aromatic diol and a carbonic acid diester to transesterification reaction.

It is another object of the present invention to provide a transparent and colorless aromatic polycarbonate composition having a high quality.

To accomplish the aims, in a first aspect of the present invention, there is provided a process for producing an aromatic polycarbonate, which comprises subjecting an aromatic diol compound and a carbonic acid diester to transesterification reaction in the presence of a defoaming agent.

In a second aspect of the present invention, there is provided a process for producing an aromatic polycarbonate, which comprises subjecting an aromatic diol compound and a carbonic acid diester to transesterification reaction in the presence of a defoaming agent comprising a hydrocarbon compound which contains at least one functional group selected from the group consisting of hydroxyl group, carboxyl group, amino group and a derivative group thereof in a concentration of 50 to 3,000 $\mu$eq/g.

In a third aspect of the present invention, there is provided an aromatic polycarbonate composition comprising an aromatic polycarbonate; and a hydrocarbon compound containing at least one functional group selected from the group consisting of hydroxyl group, carboxyl group, amino group and a derivative group thereof in a concentration of 50 to 3,000 $\mu$eq/g, and having a number-average molecular weight of 500 to 20,000, said hydrocarbon compound being present in an amount of 0.01 to 5,000 ppm based on the weight of an aromatic diol compound component in said aromatic polycarbonate.

DETAILED DESCRIPTION OF THE INVENTION

Figure 1:
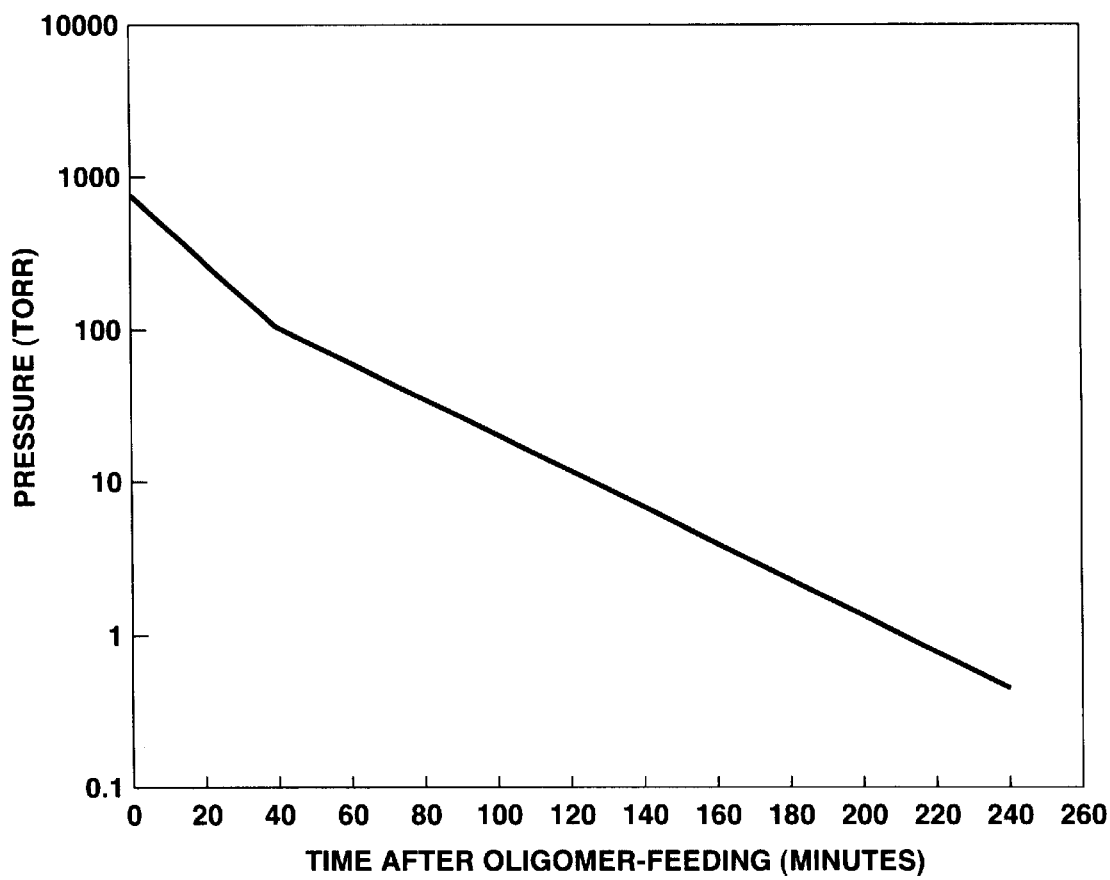
FIG. 1 is a graph showing a pressure-reducing program within a polymerization vessel used in Example 1.

The present invention will be described in detail below.

In the process of the present invention, an aromatic diol compound and a carbonic acid diester are used as raw materials of the aromatic polycarbonate. As the aromatic diol compound, there may be usually exemplified those represented by the following general formula (1):

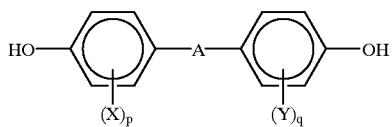

(1)

wherein A is selected from the group consisting of a single bond, divalent radicals derived from substituted or unsubstituted $C_1$ to $C_{10}$ linear, branched or cyclic hydrocarbons, and divalent radicals represented by —O—, —S—, —CO—, —SO— and —$SO_2$—; X and Y are independently a monovalent group selected from the group consisting of a halogen atom and substituted or unsubstituted $C_1$ to $C_6$ hydrocarbon groups, and may be the same or different from each other; and p and q are independently an integer of 0 to 2, and may be the same or different from each other.

Specific examples of the aromatic diol compounds may include bisphenol-substituted hydrocarbons such as bis(4-hydroxyphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane and 1,1-bis(4-hydroxyphenyl)cyclohexane; bis(4-hydroxyphenyl)sulfone; bis(4-hydroxyphenyl)sulfide; bis(4-hydroxyphenyl)ether; bis(4-hydroxyphenyl)ketone; or the like. Among these aromatic diol compounds, 2,2-bis(4-hydroxyphenyl)propane (bisphenol A) is preferred.

These aromatic diol compounds may be used singly or in the form of a mixture of any two or more thereof. In addition, when it is intended to produce branched aromatic polycarbonates, a small amount of trihydric or higher polyhydric phenol may be copolymerized with the aromatic diol compounds. For the purpose of enhancing the heat stability or hydrolytic resistance of the aromatic polycarbonate, a monohydric phenol such as p—t-butyl phenol and p-cumyl phenol may be blended therein as a hydroxy-terminal-sealing agent.

As the carbonic acid diesters used in the present invention, there may be usually exemplified those compounds represented by the following general formula (2):

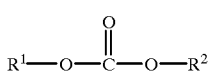

(2)

wherein $R^1$ and $R^2$ are independently a group selected from the group consisting of substituted or unsubstituted $C_1$ to $C_{10}$ linear, branched or cyclic alkyl groups, and $C_1$ to $C_{10}$ alkyl- and/or halogen-substituted or unsubstituted aryl groups, and $R^1$ and $R^2$ may be the same or different from each other.

Specific examples of the carbonic acid diesters may include dimethyl carbonate, diphenyl carbonate, ditolyl carbonate, bis(4-chlorophenyl)carbonate, bis(2,4,6-trichlorophenyl)carbonate or the like. Among these carbonic acid diesters, diphenyl carbonate is preferred. These carbonic acid diesters may be used singly or in the form of a mixture of any two or more thereof.

The carbonic acid diester is generally used in a slightly excessive amount, i.e., usually 1.01 to 1.30 moles, preferably 1.02 to 1.20 moles based on one mole of the aromatic diol compound.

In the melt-polycondensation reaction of the aromatic diol compound and the carbonic acid diester, a transesterification catalyst may be usually used in order to increase the polymerization velocity. As the suitable transesterification catalysts used in the present invention, there may be exemplified alkali metal compounds, alkaline earth metal compounds, basic nitrogen-containing compounds or phosphonium hydroxide compounds.

Specific examples of the alkali metal compounds and alkaline earth metal compounds may include hydroxides of alkali metals or alkaline earth metals such as sodium hydroxide, potassium hydroxide, lithium hydroxide, cesium hydroxide, calcium hydroxide, barium hydroxide, magnesium hydroxide and strontium hydroxide; inorganic salts of alkali metals or alkaline earth metals such as sodium hydrogen carbonate, potassium hydrogen carbonate, lithium hydrogen carbonate, cesium hydrogen carbonate, calcium hydrogen carbonate, barium hydrogen carbonate, magnesium hydrogen carbonate, strontium hydrogen carbonate, sodium carbonate, potassium carbonate, lithium carbonate, cesium carbonate, calcium carbonate, barium carbonate, magnesium carbonate, strontium carbonate, sodium hydride and aluminum lithium hydride; organic acid salts of alkali metals or alkaline earth metals such as sodium acetate, potassium acetate, lithium acetate, cesium acetate, calcium acetate, barium acetate, magnesium acetate, strontium acetate, sodium stearate, potassium stearate, lithium stearate, cesium stearate, calcium stearate, barium stearate, magnesium stearate and strontium stearate; alcoholates of alkali metals or alkaline earth metals such as a sodium salt, potassium salt, lithium salt, cesium salt, calcium salt, barium salt, magnesium salt or strontium salt of bisphenol A or phenol, sodium methylate and sodium ethylate; or the like. Among these compounds, the alkali metal compounds are preferred, and the cesium salts are more preferred. These alkali metal compounds or alkaline earth metal compounds may be used singly or in the form of a mixture of any two or more thereof.

The amount of the alkali metal compounds or the alkaline earth metal compounds added is not particularly restricted. However, the use of a too small amount of the compound fails to obtain a sufficient polymerization velocity, and the use of a too large amount of the compound results in deteriorated color tone of the obtained polycarbonate. The amount of the alkali metal compounds or the alkaline earth metal compounds added is usually $1\times10^{-8}$ to $1\times10^{-1}$ mole, preferably $1\times10^{-7}$ to $1\times10^{-3}$ mole based on one mole of the aromatic diol compound.

Specific examples of the basic nitrogen-containing compounds may include alkyl-, aryl- or alkaryl-containing ammonium hydroxides such as tetramethyl ammonium hydroxide and tetraethyl ammonium hydroxide; tertiary amines such as trimethyl amine and triethyl amine; secondary amines such as dimethyl amine and diethyl amine; primary amines such as n-butyl amine; imidazoles such as 2-methyl imidazole and 2-phenyl imidazole; iminocarboxylic acid derivatives or salts thereof such as nitrilotriacetic acid; ammonium borohydrides such as tetramethyl ammonium borohydride and tetrabutyl ammonium borohydride; or the like.

Specific examples of the phosphonium hydroxide compounds may include tetraethyl phosphonium hydroxide, tetrabutyl phosphonium hydroxide, tetraphenyl phosphonium hydroxide, methyltriphenyl phosphonium hydroxide or the like. Among these phosphonium hydroxide compounds, tetrabutyl phosphonium hydroxide and tetraphenyl phosphonium hydroxide are preferred.

The basic nitrogen-containing compounds and the phosphonium hydroxide compounds are preferably used in combination with the alkali metal compounds or the alkaline earth metal compounds. Among these basic nitrogen-containing compounds and phosphonium hydroxide compounds, there are preferably used those capable of being readily decomposed or evaporated at an elevated temperature so as not to remain in the polycarbonate produced.

The amount of the basic nitrogen-containing compound or the phosphonium hydroxide compound added is not restricted, but usually $1\times10^{-8}$ to $1\times10^{-1}$ mole, preferably $1\times10^{-7}$ to $1\times10^{-2}$ mole based on one mole of the aromatic diol compound.

The defoaming agent used in the present invention are substances capable of exhibit a foam-inhibiting or foam-breaking effect even when added in a small amount. Specific examples of the defoaming agents may include fats and oils such as mineral oils and animal or plant oils; surfactants such as metal soaps, organic sulfonic acid salts, organophoric acid salts and alkyl benzene compounds; phosphoric acid esters; phosphorous acid esters; hydrocarbons; halogenated hydrocarbons; polyalkylene oxide compounds; polysiloxane compounds such as silicone oils; higher alcohols having not less than 8 carbon atoms and derivatives thereof; higher fatty acids having not less than 8 carbon atoms and derivatives thereof; or the like.

Among these defoaming agents, the following compounds are preferred from the standpoints of defoaming effect and color tone of the obtained product:

(a) Compounds having a chain hydrocarbon structure having not less than 8 carbon atoms;

(b) hydrocarbon compounds containing at least one functional group selected from the group consisting of hydroxyl group, carboxyl group, amino group and a derivative group thereof;

(c) polyalkylene oxide compounds; and (d) polysiloxane compounds.

The compounds (a) having a chain hydrocarbon structure having not less than 8 carbon atoms may have double bonds or triple bonds in a carbon chain thereof, or may have an aliphatic ring or an aromatic ring. Further, the compounds (a) may be linear or branched. However, the compounds (a) are required to have a continuous chain structure containing usually not less than 8 carbon atoms, preferably not less than 10 carbon atoms, more preferably not less than 12 carbon atoms to which only hydrogen atoms or halogen atoms are bonded.

Specific examples of the compounds (a) having a chain hydrocarbon structure having not less than 8 carbon atoms may include (1) hydrocarbons or hydrocarbon-based waxes such as alkanes, alkenes, alkynes, cycloalkanes, cycloalkenes, arylalkanes, arylalkenes and arylalkynes, (2) homopolymers or copolymers containing at least one compound selected from the group consisting of $\alpha$-olefins such as ethylene, propylene, 1-butene, 1-pentene, 3-methyl-1-pentene and 1-hexene; double bond-containing cyclic hydrocarbon compounds such as cyclopentene and cyclohexene; double bond-containing aromatic hydrocarbon compounds such as styrene and $\alpha$-methyl styrene; and diene compounds such as butadiene, 1,3-pentadiene, chloroprene and isoprene, (3) higher alcohols such as dodecanol, stearyl alcohol, nonadecanol and behenyl alcohol; and derivatives thereof, e.g., esters, ethers and alcoholates of the higher alcohols, (4) higher fatty acids such as lauric acid, palmitic acid, stearic acid, behenic acid, montanic acid, oleic acid and linolic acid; fatty acids having a plurality of carboxyl groups such as dodecandioic acid and dimer acids; and derivatives of the higher fatty acids or the fatty acids having a plurality of carboxyl groups, e.g., esters, amides and metal salts of, the higher fatty acids or the fatty acids having a plurality of carboxyl groups, (5) alkyl amines such as dodecyl amine and stearyl amine, and (6) phenols such as octyl phenol, nonyl phenol, decyl phenol, dodecyl phenol and higher alkyl-substituted bisphenol A having $C_3$ to $C_{20}$ alkyl group; and derivatives of the phenols, e.g., esters, ethers or phenolates of the phenols. Among these compounds (a), higher alcohols and derivatives thereof, higher fatty acids and derivatives thereof, fatty acids having a plurality of carboxyl groups and derivatives thereof, and higher alkyl-substituted phenols having $C_3$ to $C_{20}$ alkyl group and derivatives thereof are preferred.

The hydrocarbon compounds (b) containing at least one functional group selected from the group consisting of hydroxyl group, carboxyl group, amino group and a derivative group thereof, usable in the present invention, are such compounds which have a hydrocarbon skeleton whose hydrogen atoms may be substituted with halogen atoms, and specific functional groups. Examples of the specific functional groups may include a hydroxyl group and a derivative group derived from a hydroxyl group such as an ester group, carbonate group and ether group; a carboxyl group and a derivative group derived from a carboxyl group such as an ester group, amide group and urethane group; and an amino group and a derivative group derived from an amino group such as an amide group, urethane group and urea group. Among these functional groups, a hydroxyl group and a derivative group thereof, and a carboxyl group and a derivative group thereof are preferred, and the hydroxyl group and the derivative group thereof are more preferred.

Specific examples of the hydrocarbon skeletons may include the same hydrocarbons as exemplified in the above-mentioned group (1), and the same homopolymers or copolymers containing at least one compound selected from the group consisting of $\alpha$-olefins, cyclic hydrocarbon compounds, aromatic hydrocarbon compounds and diene compounds as exemplified in the above-mentioned group (2), with respect to the compounds having a chain hydrocarbon structure having not less than 8 carbon atoms. The hydrocarbon compounds used in the present invention may further contain other atoms than carbon, hydrogen and halogens, or the hydrocarbon compounds may be used in the from of a mixture of any two or more thereof, unless the effects of the present invention are adversely affected thereby. Among these hydrocarbon skeletons, the homopolymers or copolymers of the diene compounds are preferred, and polybutadiene is more preferred.

In general, homopolymers or copolymers of diene compounds having a conjugated double bond such as butadiene, have a 1,2-addition structure and/or a 1,4-addition structure. When the homopolymers and copolymers containing 1,2-addition structure in an amount of preferably not less than 50%, more preferably not less than 70%, still more preferably not less than 80% based on total conjugated diene monomer units, are used, the effects of the present invention can be more remarkably exhibited. Further, in order to inhibit the cross-linking reaction during the polymerization, unsaturated bonds of the homopolymers or copolymers of the diene compounds are preferably hydrogenated using a transition metal catalyst or the like.

As the method for the polymerization of the diene compounds, there may be used any of radical polymerization method, cation polymerization method, anion polymerization method and coordinated anion polymerization method. Among them, in order to produce such homopolymers or copolymers containing a 1,2-addition structure in an amount of not less than 50% based on total monomer units, the use of the anion polymerization method is preferred.

To accomplish the aims of the present invention, it is required that the hydrocarbon compounds (b) used as the defoaming agent contain the functional group selected from hydroxyl group, carboxyl group, amino group and a derivative group thereof in a concentration (in the case where a plurality of functional groups are contained, total concentration thereof) of 50 to 3,000 µeq/g, preferably 300 to 2,000 µeq/g, more preferably 500 to 1,500 µeq/g. When the concentration of the functional group contained in the hydrocarbon compound (b) is too small, the obtained polycarbonate is deteriorated in transparency. On the contrary, when the concentration of the functional group is too large, undesired side reactions such as cross-linking reaction are caused, resulting in poor quality of the obtained polycarbonate.

Also, the functional group may be introduced into the hydrocarbon compounds by any conventional method either upon or after the polymerization of the diene compounds. Specifically, the introduction of a hydroxyl group or a derivative group thereof may be carried out by reacting a living polymer of the diene compound with ethylene oxide or the like; subjecting the diene compound to radical polymerization using a hydroxyl group-containing radical initiator such as hydrogen peroxide; or reacting a hydroxyl group-containing polymer with an acid halide or an acid anhydride. The carboxyl group or the derivative group thereof can be introduced by reacting a living polymer of the diene compound with carbon dioxide; subjecting the diene compound to radical polymerization using an initiator containing a carboxyl group or a derivative group thereof such as 4,4'-azobis(4-cyanovaleric acid); or reacting the polymer with a monomer containing a carboxyl group or a derivative group thereof. The amino group and the derivative group thereof can be introduced by cyano-ethylating, hydrogenating or halogenating a hydroxyl group of the hydroxyl-containing polymer and then aminating the obtained polymer.

The polyalkylene oxide compounds (c) used in the present invention are those compounds having in a molecule thereof, a structure represented by the general formula (3):

$$—(O—R^3—O)_n— \quad (3)$$

wherein $R^3$ is a branched or unbranched alkylene group having 2 to 6, preferably 2 to 4 carbon atoms; and n is an integer of not less than 2, preferably not less than 4.

Specific examples of the polyalkylene oxide compounds (c) having the structure of the general formula (3) may include polyethylene oxide, polypropylene oxide, polytetramethylene oxide and copolymers thereof; compounds having a structure of adding an alkylene oxide to alcohols such as ethanol, propanol, stearyl alcohol, glycerol and tirmethylol propane; compounds having a structure of adding an alkylene oxide to phenols such as butyl phenol, nonyl phenol, dodecyl phenol and bisphenol A; or the like.

Further, in order to maintain a good transparency of the obtained polycarbonate, the polyalkylene oxide compounds (c) preferably have at molecule ends thereof, a functional group such as a hydroxyl group or a derivative group derived from a hydroxyl group, e.g., an ester group, carbonate group or ether group; a carboxyl group or a derivative group derived from a carboxyl group, e.g., an ester group, amide group or urethane group; an amino group or a derivative group derived from an amino group, e.g., an amide group, urethane group or urea group; or the like. Among these polyalkylene oxide compounds (c), those having a hydroxyl group or a derivative group thereof are preferred. The number of functional groups introduced into the polyalkylene oxide compounds (c) is not particularly restricted, but usually 1 to 4 per one molecule of the polyalkylene oxide compound.

The polysiloxane compounds (d) used in the present invention are those compounds having in a molecule thereof, a structure represented by the general formula (4):

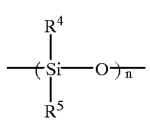

(4)

wherein $R^4$ and $R^5$ are independently a branched or unbranched alkyl group having usually 1 to 10 carbon atoms, preferably 1 to 4 carbon atoms, especially a methyl group, and may be the same or different from each other; and n is an integer of usually not less than 6, preferably 10 to 500, more preferably 30 to 100.

The polysiloxane compounds generally have at a molecule end thereof, usually an alkyl group, especially a methyl group, or may have a functional group such as a hydroxyl group or a derivative group derived from a hydroxyl group, e.g., an ester group, a carbonate group or ether group; a carboxyl group or a derivative group derived from carboxyl group, e.g., an ester group, amide group or urethane group; an amino group or a derivative group derived from an amino group, e.g., an amide group, urethane group or urea group; or the like. The polysiloxane compounds (d) may also be bonded at a molecule end thereof, to compounds having the above functional groups.

The molecular weight of the defoaming agent is not particularly restricted. However, when the molecular weight is too small, the defoaming agent tends to be evaporated during the polymerization reaction, so that any defoaming effect cannot be exhibited. On the contrary, when the molecular weight is too large, the foam-inhibiting or foam-breaking effect is lessened. Therefore, the defoaming agent has a number-average molecular weight of preferably 200 to 30,000, more preferably 500 to 10,000, still more preferably 1,000 to 5,000 when measured by end-group determination method, gel permeation chromatography (GPC), vapor pressure osmometry (VPO) or the like.

The amount of the defoaming agent added is also not particularly restricted. However, when the amount of the defoaming agent added is too small, the defoaming agent may not exhibit a sufficient defoaming effect. On the contrary, when the amount of the defoaming agent added is too large, the obtained polycarbonate may be deteriorated in quality such as transparency. The lower limit of the amount of the defoaming agent added is usually 0.01 ppm, preferably 0.1 ppm, more preferably 1 ppm based on the weight of the aromatic diol compound used as a raw material, and the upper limit of the amount of the defoaming agent added is usually 5,000 ppm, preferably 1,000 ppm, more preferably 500 ppm based on the weight of the aromatic diol compound used as a raw material.

More specifically, in the case where the hydrocarbon compounds (b) containing at least one functional group selected from the group consisting of hydroxyl group, carboxyl group, amino group and a derivative group thereof are used as the defoaming agent, the lower limit of the amount of the defoaming agent added is preferably 0.05 ppm, more preferably 0.1 ppm, still more preferably 0.5 ppm based on the weight of the aromatic diol compound used as a raw material, and the upper limit of the amount of the defoaming agent added is preferably 1,000 ppm, more preferably 100 ppm, still more preferably 30 ppm, most preferably 20 ppm based on the weight of the aromatic diol compound used as a raw material.

In the case where upon addition of the defoaming agent, at least a part of the aromatic diol compound is already transformed into the transesterification reaction product, the defoaming agent may be added in the above-described amount based on the total amount of transformed and untransformed aromatic diol compounds.

These defoaming agents may be used singly or in the form of a mixture of any two or more thereof.

The process for the production of the aromatic polycarbonate by the melting method according to the present invention may be conducted by any of a batch method, a continuous method or the combination thereof. In order to prevent an ill-balanced molar ratio between the aromatic diol compound and the carbonic acid diester by volatilization of the carbonic acid diester, the process may be generally carried out in steps comprising a pre-polycondensation step conducted at a relatively low temperature under low vacuum (oligomerization step) and a post-polycondensation step conducted at a relatively high temperature under high vacuum (polymerization step). Morn specifically, the oligomerization step may be conducted at a temperature of usually 100 to 300° C., preferably 180 to 280° C. under a pressure between atmospheric pressure and 1 Torr. Whereas, the polymerization step may be conducted at a temperature of usually 200 to 320° C., preferably 240 to 300° C. under a pressure of not more than 50 Torr which is preferably finally reduced to not more than 1 Torr.

The defoaming agent may be added directly or in the form of a diluted solution in an appropriate solvent, to the raw materials or the oligomer produced therefrom. The timing of the addition of the defoaming agent is not particularly restricted, and the defoaming agent may be added to the raw materials prior to the polymerization or at an optional stage during the polymerization reaction. However, in order to optimally exhibit the effects of the present invention, the defoaming agent is preferably added prior to the occurrence of severe foaming, especially at such a stage where the reaction pressure is not less than 30 Torr.

By conducting the above process in which the hydrocarbon compounds (b) is used as a defoaming agent, of the present invention, the aromatic polycarbonate is produced in the form of an aromatic polycarbonate composition which comprises the aromatic polycarbonate and the hydrocarbon compounds (b) containing at least one functional group selected from the group consisting of hydroxyl group, carboxyl group, amino group and a derivative group thereof, such that the hydrocarbon compounds (b) are present in an amount of usually 0.01 to 5,000 ppm based on the weight of the aromatic diol compound component in the polycarbonate. The obtained aromatic polycarbonate composition preferably has a yellow index (YI) of not more than 2.3.

The thus obtained aromatic polycarbonate may be blended with other conventional additives such as a heat stabilizer, a light stabilizer, an ultraviolet light absorber, an anti-oxidant, an anti-static agent, an antiseptic agent, an adhesion promoter, a colorant, a foaming agent, an anti-blocking agent, a lubricant, a spreading agent, a disinfectant, a plasticizer, a mold-releasing agent, a thickener, a drip-proofing agent, an impact resistance-modifying agent, inorganic fillers, organic fillers or the like.

According to the process of the present invention, by subjecting the aromatic diol compound and the carbonic acid diester to transesterification reaction, it is possible to produce a transparent and colorless aromatic polycarbonate having a high quality, at a high polymerization velocity without occurrence of significant foaming phenomenon.

EXAMPLES

The present invention will be described in more detail below by reference to examples, but these examples are not intended to limit the scope of the present invention thereto.

Various properties were measured by the following methods.

(1) Viscosity-average Molecular Weight (Mv)

The viscosity-average molecular weight (Mv) of oligomer or polycarbonate was calculated from a specific viscosity ($\eta sp$) thereof measured at 20° C. using a methylene chloride solution of oligomer or polycarbonate at a concentration (C) of 0.6 g/dl, according to the following formulae:

$$\eta sp/C=[\eta](1+0.28\eta sp)$$

$$[\eta]=1.23\times10^{-4}\times(M_v)0.83$$

(2) Transparency of Polycarbonate

The polycarbonate was injection-molded into a plate having a size of 60 mm×60 mm×3.2 mm at a barrel temperature of 320° C. The transparency of the obtained plate was evaluated by measuring a whole light transmittance thereof using a haze meter manufactured by Tokyo Denshoku Co., Ltd.

(3) Yellow Index (YI) of Polycarbonate

The yellow index of the above plate was measured using a spectrocolorimeter "CM-3700d" manufactured by Minolta Co., Ltd.

(4) Number-average Molecular Weight ($M_n$) of Defoaming Agent

1) Hydrocarbon-based Waxes (a) and Polysiloxane Compounds (d)

The number-average molecular weights of the hydrocarbon-based waxes (a) and the polysiloxane compounds (d) were measured by a gel permeation chromatography and calculated by calibration based on polystyrene having a known molecular weight.

2) Polyalkylene Oxide Compounds (c)

The polyalkylene oxide compound was treated with a pyridine solution of phthalic anhydride to esterify OH groups bonded to opposite molecule ends thereof. An excess amount of the acid used was titrated with sodium hydroxide. The number-average molecular weight of the polyalkylene oxide compound was calculated from the amount of acid required for the esterification of the compound.

3) Single Substances

In the case of substantially single substances having no molecular weight distribution, the molecular structure was analyzed to calculate a number-average molecular weight thereof.

4) Hydrocarbon Compounds (b) Containing at Least One Functional Group Selected from the Group Consisting of Hydroxyl Group, Carboxyl Group, Amino Group and a Derivative Group Thereof The number-average molecular weight of the hydrocarbon compounds (b) was measured using toluene as a solvent by a vapor pressure osmometer "117 type" manufactured by Hitachi Ltd.

(5) Percentage of 1,2-addition Structure of Hydrogenated Polybutadiene and Concentration of Functional Group Thereof A heavy chloroform solution of a sample was prepared to measure $^1$H-NMR thereof using an analyzer "JNM-A400" manufactured by Nihon Denshi Co., Ltd. The percentage of 1,2-addition structure and the concentration of functional group were calculated from peak intensity ratios of methyl, methylene and methine, and methylene and methine adjacent to the functional group.

(6) Foaming Condition

The rise of liquid level in the polymerization vessel was visually observed.

(7) Content of Hydrocarbon Compounds (b) in Polycarbonate

The polycarbonate was mixed with an aqueous 1N-KOH solution, and heated for hydrolysis thereof. Thereafter, the hydrolyzed solution was extracted with chloroform and then concentrated. A heavy chloroform solution of the thus obtained concentrate was subjected to $^1$H-NMR measurement using an analyzer "JNM-A400" manufactured by Nihon Denshi Co., Ltd., to determine the content of the hydrocarbon compounds (b) therein.

Example 1

An aqueous cesium carbonate solution (content of cesium carbonate: 0.5 μmol/mol-bisphenol A) and a solution prepared by diluting 1.00 g (200 ppm based on bisphenol A) of a polyethylene wax having a number-average molecular weight of 2,200 as a defoaming agent, with toluene, were added to 23.1 mol of diphenyl carbonate flakes (produced by Mitsubishi Chemical Corp.) using a micro-syringe, and intimately mixed together. The obtained mixture was charged into a 40-liter polymerization vessel equipped with a reflux condenser controlled to 100° C., and then 22.0 mol of bisphenol A (produced by Shin-Nittetsu Kagaku Co., Ltd.) was charged into the polymerization vessel. The interior of the polymerization vessel was evacuated to 10 Torr and then returned to atmospheric pressure by introducing nitrogen thereinto. The evacuation and nitrogen-introduction procedure was repeated seven times, thereby replacing the interior of the polymerization vessel with nitrogen. Then, the contents of the polymerization vessel were heated and dissolved by passing a heat medium having a temperature of 230° C. therethrough, and then stirred at 300 rpm. While maintaining the inside temperature of the polymerization vessel at 210° C., the inside pressure of the polymerization vessel was reduced from 760 Torr to 100 Torr for 40 minutes. Successively, while maintaining the inside pressure of the polymerization vessel at 100 Torr, the contents thereof were subjected to oligomerization reaction for 80 minutes while distilling off phenol therefrom.

After completion of the oligomerization reaction, the pressure of the reaction system was returned to 0.2 MPa by introducing nitrogen thereinto. The resultant oligomer was fed under pressure to a 40-liter polymerization vessel (maintained under atmospheric pressure) equipped with a reflux condenser controlled to 100° C. Then, the interior of the polymerization vessel was exposed to atmospheric pressure. While stirring the contents of the polymerization vessel at 38 rpm, a heat medium having a temperature of 300° C. was circulated through an external jacket of the vessel, and the pressure of the reaction system was reduced along the characteristic curve shown in FIG. 1 to observe the foaming condition therein. When reaching 0.5 Torr, the contents of the polymerization vessel were subjected to condensation reaction for 90 minutes while keeping the inside pressure thereof at 0.5 Torr, thereby causing the contents of the vessel to be polymerized. The inside temperature of the polymerization vessel was finally 280° C.

After completion of the polymerization reaction, the inside pressure of the polymerization vessel was returned to atmospheric pressure by introducing nitrogen thereinto, and the obtained polymer was extruded into strands which were then cut into pellets using a rotary cutter.

Example 2

The same procedure as defined in Example 1 was conducted except that stearyl alcohol was used as a defoaming agent, thereby producing a polymer while observing a foaming condition of the reaction system.

Example 3

The same procedure as defined in Example 1 was conducted except that stearic acid monoglyceride was used as a defoaming agent, thereby producing a polymer while observing a foaming condition of the reaction system.

Example 4

The same procedure as defined in Example 1 was conducted except that the silicone oil (produced by Shin-Etsu Kagaku Kogyo Co., Ltd.) represented by the formula:

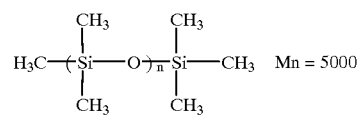

was used as a defoaming agent, thereby producing a polymer while observing a foaming condition of the reaction system.

Example 5

The same procedure as defined in Example 1 was conducted except that the compound (tradename: "SUNNIX PP-3000", produced by Sanyo Kasei Kogyo Co., Ltd.) represented by the formula:

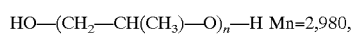

was used as a defoaming agent, thereby producing a polymer while observing a foaming condition of the reaction system.

Example 6

The same procedure as defined in Example 1 was conducted except that the compound (tradename: "PTMG-3000", produced by Mitsubishi Chemical Corp.) represented by the formula:

HO—[(CH$_2$)$_4$—O]$_n$—H  Mn=2,950, was used as a defoaming agent, thereby producing a polymer while observing a foaming condition of the reaction system.

Example 7

The same procedure as defined in Example 6 was conducted except that the amount of the defoaming agent added was changed to 50 g (9,955 ppm based on bisphenol A), thereby producing a polymer while observing a foaming condition of the reaction system.

Example 8

The same procedure as defined in Example 6 was conducted except that the amount of the defoaming agent added was changed to 0.0004 g (0.08 ppm based on bisphenol A), thereby producing a polymer while observing a foaming condition of the reaction system.

Comparative Example 1

The same procedure as defined in Example 1 was conducted except that no defoaming agent was added, thereby producing a polymer while observing a foaming condition of the reaction system.

Figure 2:
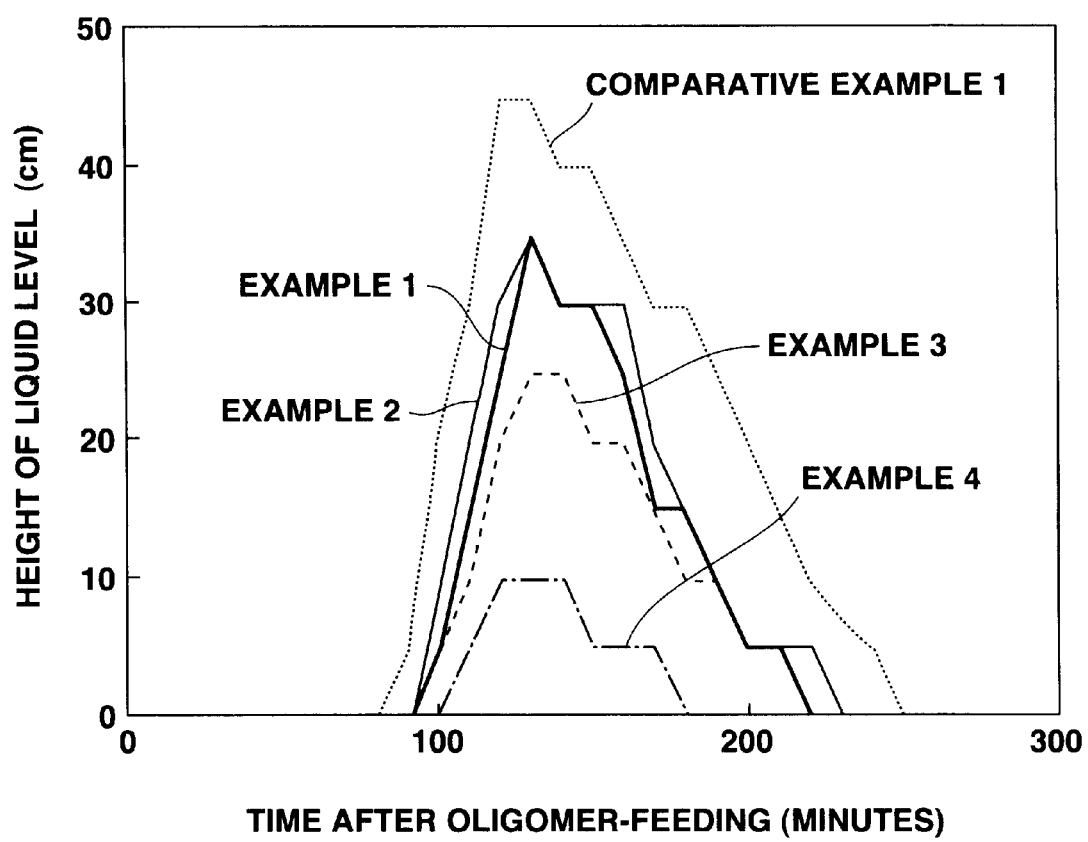
FIG. 2 is a graph showing the change in foaming condition within polymerization vessels used in Examples 1 to 4 and Comparative Example 1, with the passage of time.
Figure 3:
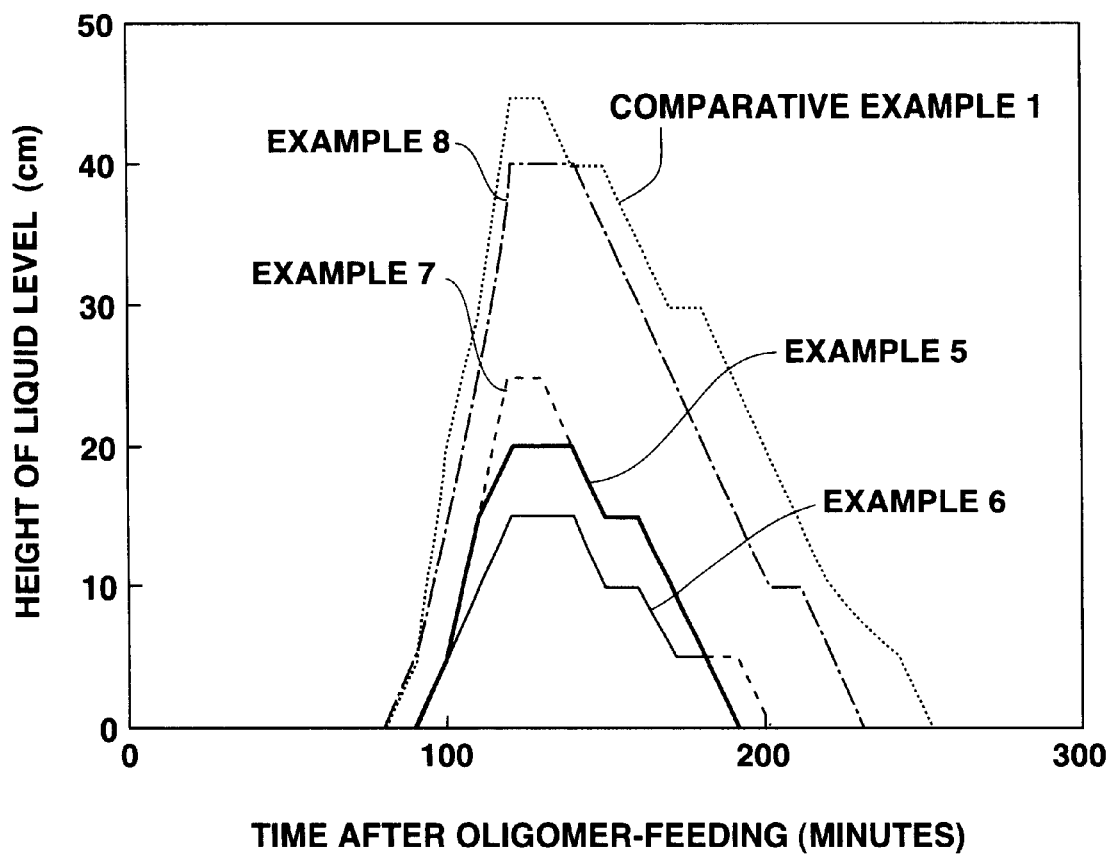
FIG. 3 is a graph showing the change in foaming condition within polymerization vessels used in Examples 5 to 8 and Comparative Example 1, with the passage of time.

The defoaming agents used in the Examples 1 to 8 and Comparative Example 1 and the evaluation results of the polymers obtained are shown in Table 1 below. Further, the change in foaming condition within the polymerization vessel with the passage of time are shown in FIG. 2 (Examples 1 to 4 and Comparative Example 1) and FIG. 3 (Examples 5 to 8 and Comparative Example 1). From these figures and table, it was confirmed that Example 7 was slightly deteriorated in defoaming effect, whole light transmittance and color tone of product as compared to Example 6, and Example 8 was slightly deteriorated in defoaming effect and color tone of product as compared to Example 6. Further, Comparative Example 1 was insufficient in defoaming effect and color tone of product as compared to any of the Examples.

Example 9

An aqueous cesium carbonate solution (content of cesium carbonate: 0.5 μmol/mol-bisphenol A) and a solution prepared by diluting 0.055 g (11 ppm based on bisphenol A) of the compound as a defoaming agent (tradename: "Polytail H", produced by Mitsubishi Chemical Corp.) having the following terminal-modified hydrogenated polybutadiene structure:

HO—(CH$_2$—CH$_2$—CH$_2$—CH$_2$)$_n$—OH  Mn=2,700, with toluene, were added to 23.1 mol of diphenyl carbonate flakes (produced by Mitsubishi Chemical Corp.) using a micro-syringe, and intimately mixed together. The obtained mixture was charged into a 40-liter polymerization vessel equipped with a reflux condenser controlled to 100° C., and then 22.0 mol of bisphenol A (produced by Shin-Nittetsu Kagaku Co., Ltd.) was charged into the polymerization vessel. The interior of the polymerization vessel was evacuated to 10 Torr, and then returned to atmospheric pressure by introducing nitrogen thereinto. The evacuation and nitrogen-introduction procedure was repeated seven times, thereby replacing the interior of the polymerization vessel with nitrogen. Then, the contents of the polymerization vessel were heated and dissolved by passing a heat medium having a temperature of 230° C. therethrough, and then stirred at 300 rpm. While maintaining the inside temperature of the polymerization vessel at 210° C., the inside pressure of the polymerization vessel was reduced from 760 Torr to 100 Torr for 40 minutes. Successively, while maintaining the inside pressure of the polymerization vessel at 100 Torr, the contents thereof were subjected to oligomerization reaction for 80 minutes while distilling off phenol therefrom.

After completion of the oligomerization reaction, the pressure of the reaction system was returned to 0.2 MPa by introducing nitrogen thereinto. The resultant oligomer was fed under pressure into a 40-liter polymerization vessel (maintained under atmospheric pressure) equipped with a reflux condenser controlled to 100° C. Then, the interior of the polymerization vessel was exposed to atmospheric pressure. While stirring the contents of the polymerization vessel at 38 rpm, a heat medium having a temperature of 300° C. was circulated through an external jacket of the vessel, and the pressure of the reaction system was reduced along the characteristic curve A shown in FIG. 4 to observe the foaming condition therein. When reaching 0.5 Torr, the contents of the polymerization vessel were subjected to

TABLE 1

| Examples and Comparative Example | Defoaming agent | | | Polycarbonate | | |
|---|---|---|---|---|---|---|
| | Kind | M$_n$ | Amount added (ppm/ bisphenol A) | Mv | Whole light transmittance (%) | YI |
| Example 1 | Polyethylene wax | 2,200 | 200 | 18,700 | 89.0 | 2.21 |
| Example 2 | Stearyl alcohol | 270 | 200 | 19,000 | 90.5 | 2.48 |
| Example 3 | Stearic acid monoglyceride | 358 | 200 | 18,900 | 90.8 | 2.15 |
| Example 4 | Silicone oil | 5,000 | 200 | 14,500 | 88.4 | 2.11 |
| Example 5 | PP-3000 | 2,980 | 200 | 18,800 | 90.1 | 2.05 |
| Example 6 | PTMG | 2,950 | 200 | 18,800 | 89.7 | 2.00 |
| Example 7 | PTMG | 2,950 | 9,955 | 18,500 | 85.2 | 2.33 |
| Example 8 | PTMG | 2,950 | 0.08 | 18,900 | 90.5 | 2.40 |
| Comparative Example 1 | — | — | 0 | 18,500 | 90.7 | 2.52 | condensation reaction for 90 minutes while keeping the inside pressure thereof at 0.5 Torr, thereby causing the contents of the vessel to be polymerized. The inside temperature of the polymerization vessel was finally 280° C.

After completion of the polymerization reaction, the inside pressure of the polymerization vessel was returned to atmospheric pressure by introducing nitrogen thereinto, and the obtained polymer was extruded into strands which were then cut into pellets using a rotary cutter.

Example 10

The same procedure as defined in Example 9 was conducted except that 0.054 g (11 ppm based on bisphenol A) of the compound (tradename: "Polytail HA", produced by Mitsubishi Chemical Corp.) represented by the formula:

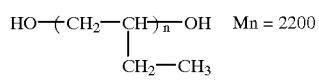

$Mn = 2200$ was used as the hydrocarbon compound, thereby producing a polymer while observing a foaming condition of the reaction system.

Example 11

The same procedure as defined in Example 9 was conducted except that 0.059 g (12 ppm based on bisphenol A) of the compound (tradename: "Polytail HAC", produced by Mitsubishi Chemical Corp.) represented by the formula:

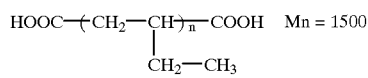

$Mn = 1500$ was used as the hydrocarbon compound, thereby producing a polymer while observing a foaming condition of the reaction system.

Example 12

The same procedure as defined in Example 9 was conducted except that the amount of the hydrocarbon compound added was changed to 30.1 g (5,993 ppm based on bisphenol A), thereby producing a polymer while observing a foaming condition of the reaction system.

Example 13

Figure 4:
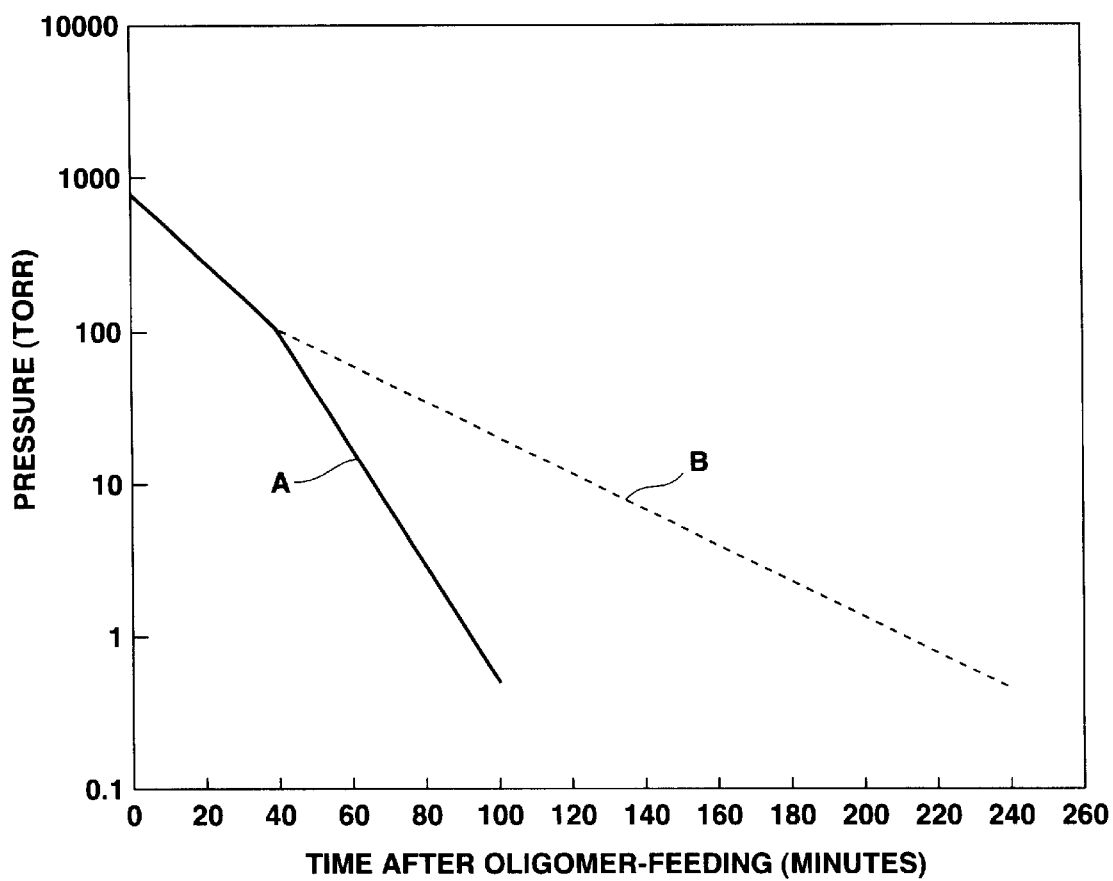
FIG. 4 is a graph showing a pressure-reducing program within polymerization vessels used in Examples 9 to 13.

The same procedure as defined in Example 9 was conducted except that the amount of the hydrocarbon compound added was changed to 0.04 mg (0.008 ppm based on bisphenol A), and the pressure of the reaction system was reduced along the characteristic curve B shown in FIG. 4 in order to avoid the clogging of a distillation pipe due to rise of the liquid level, thereby producing a polymer while observing the foaming condition of the reaction system.

Figure 5:
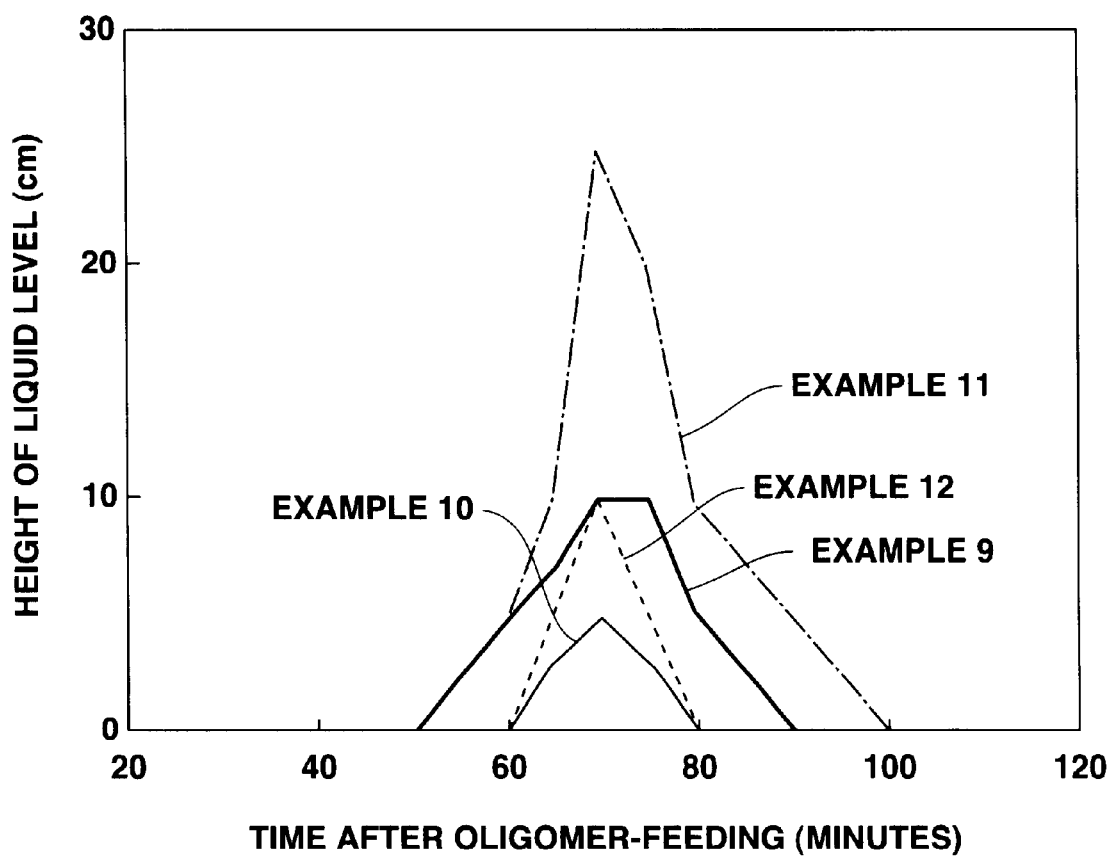
FIG. 5 is a graph showing the change in foaming condition within polymerization vessels used in Examples 9 to 12, with the passage of time.
Figure 6:
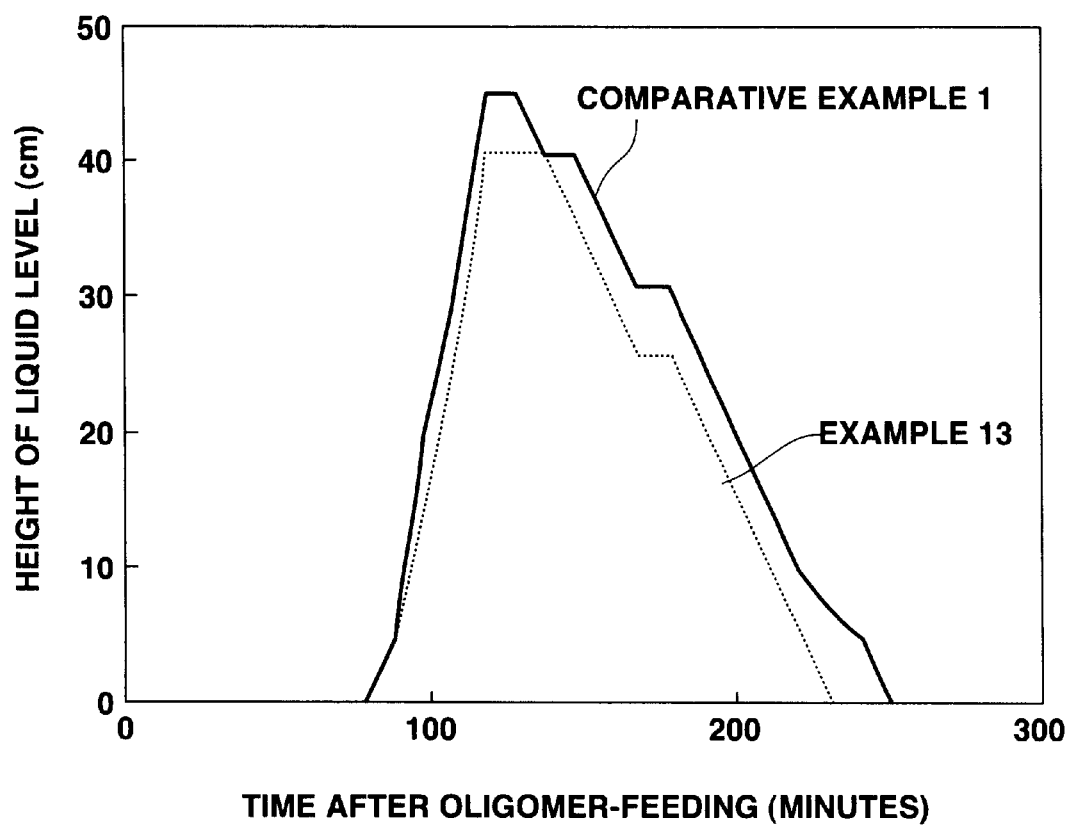
FIG. 6 is a graph showing the change in foaming condition within polymerization vessels used in Example 13 and Comparative Example 1, with the passage of time.

The kinds and amounts of the hydrocarbon compounds used in Examples 9 to 13 and the evaluation results of the polymers obtained are shown in Table 2 below. Further, The changes in foaming condition within the polymerization vessel with the passage of time are shown in FIG. 5 (Examples 9 to 12) and FIG. 6 (Example 13 and Comparative Example 1). From these figures and table, it was confirmed that Example 12 was slightly deteriorated in whole light transmittance and color tone of product as compared to Example 9, and Example 13 was slightly deteriorated in defoaming effect and color tone of product as compared to Example 9. Further, Example 10 was excellent in both defoaming effect and color tone of product.

TABLE 2

| Examples and Comparative Example | Hydrocarbon compound (HCC) | | | | Aromatic polycarbonate | | | |
|---|---|---|---|---|---|---|---|---|
| | Kind | 1,2-addition structure (mol %) | Concentration of functional group ($\mu$eq/g) | Amount added (ppm/ bisphenol A)* | $M_v$ | Whole light transmittance (%) | YI | Content of HCC (ppm/ bisphenol A)* |
| Example 9 | Polytail H | 9 | 852 | 11 | 18,500 | 90.8 | 1.83 | 10 |
| Example 10 | Polytail HA | 86 | 818 | 11 | 18,700 | 91.0 | 1.79 | 10 |
| Example 11 | Polytail HAC | 86 | 1,000 | 12 | 18,300 | 90.0 | 1.92 | 9 |
| Example 12 | Polytail H | 9 | 852 | 5,993 | 16,900 | 85.5 | 2.37 | 5,540 |
| Example 13 | Polytail H | 9 | 852 | 0.008 | 18,800 | 90.7 | 2.43 | 0.006 |
| Comparative Example 1 | — | — | — | 0 | 18,500 | 90.7 | 2.52 | 0 |

Note:
*The amount of the hydrocarbon compound (HCC) added was based on the weight of bisphenol A as a raw material, and the content of the HCC was based on the weight of the bisphenol A component contained in the obtained aromatic polycarbonate.

What is claimed is:

1. A process for producing an aromatic polycarbonate comprising:

subjecting an aromatic diol compound and a carbonic acid diester to transesterification reaction in the presence of a defoaming agent.

2. A process according to claim 1, wherein said defoaming agent comprises a compound having a chain hydrocarbon structure having not less than 8 carbon atoms.

3. A process according to claim 1, wherein said defoaming agent comprises a polyalkylene oxide compound.

4. A process according to claim 1, wherein said defoaming agent comprises a polysiloxane compound.

5. A process according to claim 1, wherein said defoaming agent has a number-average molecular weight of 200 to 30,000.

6. A process according to claim 1, wherein said defoaming agent is present in an amount of 0.01 to 5,000 ppm based on the weight of said aromatic diol compound used as a raw material.

7. A process according to claim 1, wherein said defoaming agent comprises a hydrocarbon compound containing at least one functional group selected from the group consisting of hydroxyl group, carboxyl group, amino group and a derivative group thereof in a concentration of 50 to 3,000 µeq/g.

8. A process according to claim 7, wherein said hydrocarbon compound has a number-average molecular weight of 500 to 20,000.

9. A process according to claim 7, wherein said hydrocarbon compound is present in an amount of 0.01 to 5,000 ppm based on the weight of said aromatic diol compound used as a raw material.

10. A process according to claim 7, wherein said hydrocarbon compound is a polymer of a diene compound or a hydrogenated compound thereof.

11. A process according to claim 10, wherein said polymer of a diene compound contains a 1,2-addition structure in an amount of not less than 50% based on the total conjugated diene compound monomer units.

12. An aromatic polycarbonate composition comprising:
an aromatic polycarbonate; and
a hydrocarbon compound containing at least one functional group selected from the group consisting of hydroxyl group, carboxyl group, amino group and a derivative group thereof in a concentration of 50 to 3,000 µeq/g, and having a number-average molecular weight of 500 to 20,000, said hydrocarbon compound being present in an amount of 0.01 to 5,000 ppm based on the weight of an aromatic diol compound component contained in said aromatic polycarbonate.

13. An aromatic polycarbonate composition according to claim 12, which has a yellow index (YI) value of not more than 2.3.

14. A process according to claim 1, wherein the process comprises the steps of:
oligiomerizing an aromatic diol compound and a carbonic acid diester in the presence of a defoaming agent under conditions conducive to forming aromatic carbonate oligiomers; and
polymerizing the aromatic carbonate oligiomers in the presence of the defoaming agent under conditions conducive to forming an aromatic polycarboniate.

* * * * *